Feb. 27, 1951
H. L. HILDESTAD
2,543,693
COMBUSTION APPARATUS
Filed June 1, 1948
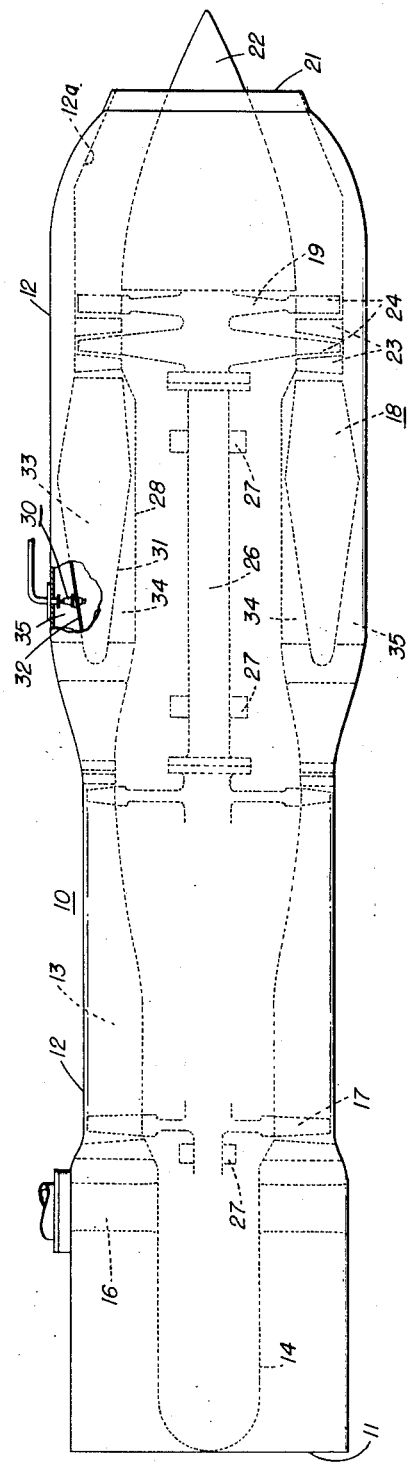
FIG. I.
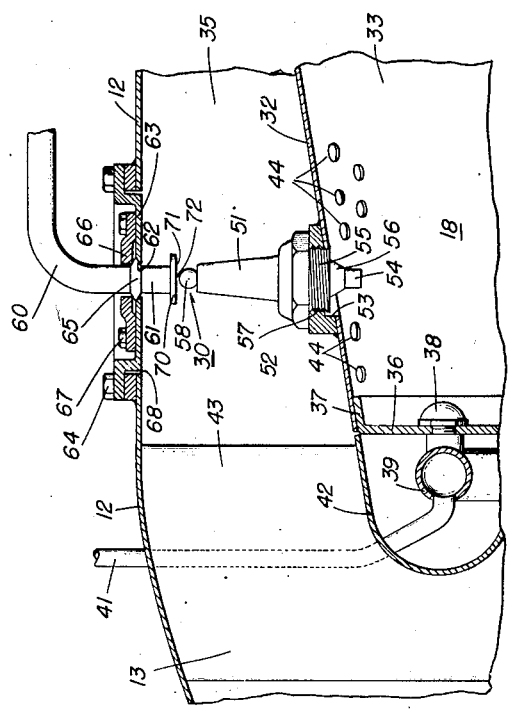
FIG. 2.
INVENTOR
Harold L. Hildestad
BY
ATTORNEY

Patented Feb. 27, 1951

2,543,693

UNITED STATES PATENT OFFICE 2,543,693

COMBUSTION APPARATUS

Harold L. Hildestad, Swarthmore, Pa., assignor, by mesne assignments, to the United States of America as represented by the Secretary of the Navy Application June 1, 1948, Serial No. 30,242

3 Claims. (Cl. 175—115)

1

This invention relates to ignition devices, more particularly to such devices for use with combustion apparatus subject to expansion and contraction due to temperature changes.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and for supplying hot gasses at suitable temperature and pressure to the turbine. The gases on leaving the turbine are discharged through a nozzle provided at the rear of the casing and may aid in propelling the aircraft.

With apparatus of this character, lightness is of extreme importance, and consequently the combustion apparatus is usually constructed of light weight material, such as sheet stainless steel. Combustion apparatus constructed of such light weight material is subject to expansion and contraction, particularly where it involves an inner wall structure defining a burner space and subject to high temperatures and an outer wall or casing spaced from the inner wall structure and cooperating therewith to define a flow path for cooling air.

In order to initiate combustion in the burner space an ignition device (usually in the form of a spark plug) must be provided, and it is preferred that such spark plug be insertable and removable from exteriorly of the outer wall or casing with its inner, or firing end, projecting into the burner space. Consequently, the spark plug usually extends through normally-aligned openings in the inner and outer walls. However, the expansion of the hot inner wall relative to the cool outer wall or casing produces misalignment of the openings with resultant twisting or straining of the spark plug, or leakage of air or gases therepast where it passes through the walls.

Accordingly, an object of the present invention is to provide ignition mechanism overcoming the abovementioned difficulties.

Another object of the invention is to provide a spark plug mounting in combustion apparatus, which mounting maintains the spark plug free of stresses.

Yet another object of the invention is to provide a spark plug and cable assembly wherein the spark plug is structurally independent of its cable.

A further object of the invention is to provide ignition apparatus including a spark plug and ignition cable therefor which have a permanent gap therebetween.

Another object of the invention is to provide

2 ignition apparatus in which the spark plug is at all times independent of its cable, whereby the spark plug and cable may be mounted on separate supporting structures subject to movement relative to each other.

These and other objects are effected by the invention as will be apparent from the following description and claims taken in connection with the accompanying drawings, forming a part of this application, in which:

Fig. 1 is a side elevational view of an aircraft gas turbine power plant incorporating the present invention; and, Fig. 2 is an enlarged fragmentary longitudinal sectional view of the ignition apparatus of the power plant of Fig. 1.

Referring now to the drawings more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The power plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the power plant, passing through the compressor 17 where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine 19 and then are discharged through the exhaust nozzle 21 to propel the aircraft.

By reference to Fig. 1 it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the ignition mechanism, indicated in its entirety by the reference character 30, for initiating burning in the combustion apparatus 18.

In the construction illustrated in the drawings the combustion apparatus 18 includes inner and outer annular walls 31 and 32, respectively, defining an annular combustion chamber 33 increasing in cross sectional area from its upstream end towards its downstream end and being overlapped both inwardly and outwardly by annular air flow spaces 34 and 35, respectively, which decrease in cross sectional area from their upstream ends towards their downstream ends.

An annular end wall 36 is positioned at the upstream end of the combustion chamber in bridging relation to the space between the inner and outer walls 31 and 32. Preferably, it is provided with flanges 37 secured to the inner and outer walls.

An annular series of fuel nozzles 38 are mounted at the downstream side of the end wall 36, within the combustion chamber 33 and direct sprays of atomized fuel towards the downstream end of the latter. These nozzles receive fuel from the annular manifold 39 supplied through the conduit 41. Preferably, the end plate 36 and manifold 39 are streamlined by provision of a fairing ring 42, carried by radial struts 43. Openings 44 are provided in the inner and outer walls 31 and 32 at suitable locations therealong for admission of air from the air spaces 34 and 35 to the interior of the combustion chamber 33.

To initiate combustion of the air fuel mixture within the upstream end of the combustion chamber 35, there is provided ignition mechanism, indicated in its entirety by the reference character 39, and comprising a spark plug 51 threadedly mounted in a boss 52 secured to the outer surface of the combustion chamber outer wall 32 at the edge of an opening 53 in said wall and through which the inner or "sparking" end of the spark plug projects to the interior of the combustion chamber. The innermost portion of the spark plug comprises a central spark discharge electrode 54 separated from the grounding terminal or electrode 55 by suitable insulating material, as at 56, the spacing of the electrodes 54 and 55 determining the spark gap. The grounding electrode 55 carries the threads 57 by which the spark plug is mounted in the boss 52 and hence serves to ground the spark plug through the metallic combustion chamber and casing structure.

The central discharge electrode 54 extends axially of the spark plug and terminates at the outer end of the latter in a domed tip 58. Electrical current is supplied to the spark plug through a cable 60 whose terminal 61 extends through an opening 62 in a cover plate 63 secured to the casing 12 by bolts 64, and into the air flow space 35, in alignment with the spark plug 51. A flange 65 on the cable is clamped against the cover plate 63 by a collar 66 which is bolted to the latter, as at 67. The opening 68 in the casing 12, and normally closed by the cover plate, is of sufficient size to permit ready insertion and removal of the spark plug 51 therethrough.

Preferably, the cable terminal 61 is provided at its innermost end with a flat disc or plate 70 whose face 71 is of material transverse extent in a plane normal to the longitudinal axis of the spark plug. This surface 71 is at all times spaced slightly from the spark plug tip 58, as at 72, with the result that the spark plug and its cable terminal are structurally independent.

As a result of this structural independence of the spark plug and its cable, no binding or stressing of either can result from expansion or contraction movements of either the combustion apparatus or the casing structure relative to each other. Due to the large transverse extent of the surface 71 relative to the spark plug tip 58, considerable movement of the latter longitudinally of the power plant may occur without interrupting the gap 72 between the tip 58 and the flat surface 71. Inasmuch as this gap 72 is materially less than the main gap at 56 between the spark plug electrodes, any spark which can jump the larger gap can also jump the smaller gap between the cable terminal and the spark plug.

While the invention has been shown in but one form, it will be obvious to those skilled in the art that it is not so limited, but is susceptible of various changes and modifications without departing from the spirit thereof.

What is claimed is:

1. In combustion apparatus including first wall structure defining a burner space and second wall structure defining, with said first wall structure, an air space overlapping said burner space; ignition apparatus including a spark plug in the air space and carried by the first wall structure with its firing end extending through an opening in the latter into the burner space, a spark plug cable carried by the second wall structure with its discharge terminal portion extending through an opening in the latter into the air space, said discharge terminal portion of the cable having a flat face lying in a plane generally normal to the longitudinal axis of the spark plug, whereby the space between the cable discharge terminal portion and the spark plug inlet end is substantially unaffected by lateral movement of the spark plug due to temperature changes in the first wall structure supporting said spark plug.

2. In combustion apparatus, inner wall structure defining a burner space, outer wall structure cooperating with said inner wall structure to define therebetween an air space overlapping the burner space, a spark plug carried by said inner wall structure and extending part way across the air space, a spark plug cable including a discharge terminal portion carried by the outer wall structure and extending part way across the air space towards the spark plug, the adjacent ends of said cable discharge terminal portion and of said spark plug being slightly spaced and structurally independent, and one of said ends having a flat face lying in a plane generally normal to the longitudinal axis of the spark plug, whereby the space between said adjacent ends remains substantially constant during lateral movement of the spark plug due to temperature changes in the inner wall structure carrying said spark plug.

3. Structure as specified in claim 2, wherein the spark plug includes a spark discharge electrode and a receiving electrode, the spacing of said electrodes being greater than the spacing of the adjacent ends of the cable discharge terminal and the spark plug.

HAROLD L. HILDESTAD.

REFERENCES CITED

The following references are of record in the file of this patent:

UNITED STATES PATENTS

| Number | Name | Date |
|---|---|---|
| 874,289 | Bemus | Dec. 17, 1907 |
| 1,277,913 | Gresham | Sept. 3, 1918 |
| 2,403,860 | Heath | July 9, 1946 |
| 2,412,878 | Fischer | Dec. 17, 1946 |